United States Patent
Kang et al.

(10) Patent No.: US 7,493,038 B2
(45) Date of Patent: Feb. 17, 2009

(54) METHOD AND APPARATUS FOR CONTROLLING PRIVACY MASK DISPLAY

(75) Inventors: Kyun Ho Kang, Jinju-si (KR); Sung Ha Seo, Yongin-si (KR)

(73) Assignee: LG Electronics Inc., Seoul (KR)

( * ) Notice: Subject to any disclaimer, the term of this patent is extended or adjusted under 35 U.S.C. 154(b) by 435 days.

(21) Appl. No.: 11/302,428

(22) Filed: Dec. 14, 2005

(65) Prior Publication Data
US 2006/0158527 A1   Jul. 20, 2006

(30) Foreign Application Priority Data
Dec. 15, 2004 (KR) .................. 10-2004-0106085
Jun. 20, 2005 (KR) .................. 10-2005-0053022

(51) Int. Cl.
*G03B 13/10* (2006.01)
(52) U.S. Cl. .............. 396/380; 396/427; 348/333.12
(58) Field of Classification Search .............. 396/60, 396/380, 419, 427; 348/151, 333.12
See application file for complete search history.

(56) References Cited

U.S. PATENT DOCUMENTS
6,744,461 B1 *   6/2004   Wada et al. ............... 348/143

2003/0227555 A1   12/2003   Kobayashi et al. ....... 348/231.6

FOREIGN PATENT DOCUMENTS
CN         1535449 A         10/2004

OTHER PUBLICATIONS
Chinese Office Action dated Dec. 7, 2007.
* cited by examiner

*Primary Examiner*—Christopher Mahoney
(74) *Attorney, Agent, or Firm*—Ked & Associates, LLP

(57) ABSTRACT

A method and an apparatus for controlling a privacy mask display includes a monitoring camera which is if tilted and its tilt angle becomes greater than 90° when a privacy mask to mask a specific target object in a captured image frame is displayed, an image and the privacy mask in the frame are rotated 180° with respect to the CCD center axis, and the optical center axis stored in the apparatus is also rotated 180° with respect to the CCD center axis. Afterwards, if the zoom ratio of the monitoring camera changes, the size and position of the privacy mask are adjusted relative to the optical center axis rotated 180° with respect to the CCD center axis. It is therefore possible to freely perform zooming and tilting operations without danger of exposing the privacy-protected target object even under the condition that the optical center axis and the CCD center axis of the monitoring camera do not coincide.

18 Claims, 4 Drawing Sheets

(a)

(b)

(a)

(b)

METHOD AND APPARATUS FOR CONTROLLING PRIVACY MASK DISPLAY

This application claims priority to Korean Patent Application No. 10-2004-0106085 filed on Dec. 15, 2004 and Korean Patent Application No. 10-2005-0053022 filed on Jun. 20, 2005. The disclosures of the previous applications are incorporated by reference herein.

BACKGROUND OF THE INVENTION

1. Field of the Invention

The present invention relates to a method and apparatus for a camera, and more particularly to a method and an apparatus for controlling a privacy mask display.

2. Description of the Related Art

A monitoring camera, a camera or video camera, may be installed to capture an image of a target object being monitored in a security-enforced area. The captured monitored image can be stored in a digital video recorder (DVR), which has been made commercially available in recent years. The monitored image captured by the monitoring camera may contain privacy-related data such as facial images of unspecified persons, thereby generating concerns about invasion of privacy. FIG. 1a illustrates an example of a monitoring camera having panning and tilting capability.

To protect the privacy of an unspecified person possibly exposed by capturing the monitored image, a method has been proposed which overlaps a privacy mask (or a masking block) such as a mosaic image with the monitored image of a target object. This method overlaps an image containing a privacy mask with the monitored image, and displays the two images together so that the privacy mask selectively masks a target object to be privacy-protected in the monitored image.

While photographing or video recording an area A at a tilt angle of about 60°, the monitoring camera 100 may be rotated 180° in the panning direction as shown in FIG. 1b, or be rotated about 60° in the tilting direction as shown in FIG. 1c, to photograph an area B opposite to the area A relative to the monitoring camera 100.

However, if the monitoring direction of the monitoring camera 100 is changed through the panning operation as in the former case, it takes a relatively long time to rotate the pan motor by 180°. If the monitoring direction of the monitoring camera 100 is changed through the tilting operation as in the latter case, it takes a relatively short time to rotate the tilt monitor by a total of about 60° because of the smaller rotation angle. However, the image captured by the monitoring camera 100 is inverted top to bottom owing to the top to bottom inversion of the monitoring camera 100 as soon as the monitoring camera 100 exceeds a 90° angle position of a vertical plane in the tilting direction (FIG. 1d). Thus, in the former case, the image is not inverted while in the latter case, the image is inverted.

If the tilt angle is greater than 90° as shown in FIG. 1d, the image is inverted from top to bottom and from left to right, by rotating the monitored image 180° with respect to a CCD center axis.

Meanwhile, the monitoring camera 100 is also able to perform zooming to adjust a size of the monitored or captured image. The monitored or captured image may be enlarged/reduced depending on whether the monitoring camera 100 is zoomed in/zoomed out. Therefore, the monitoring camera 100 is able to independently pan, tilt, and zoom in accordance with a user's request or automatically based on sensor, detectors and/or prescribed programming to monitor the place where the monitoring camera 100 is installed to observe various areas of the place of installation, such as a security area.

For such a monitoring camera 100, a privacy mask of a predetermined size is overlapped over the a monitored image at a proper region so that a specified target object requiring privacy protection is not exposed to the captured image frame, where a captured image may be one of a photograph or video.

While the privacy mask is overlapped over the monitored image or the specified target object contained in a captured image frame or the monitored image, if the monitoring camera 100 is rotated in the panning or tilting direction or is zoomed in or out, then the monitored image of the specified target object in the captured image frame is shifted and/or enlarged/reduced corresponding to the rotation and zooming. Corresponding to this, the position and/or size of the privacy mask is adjusted when the monitored image is shifted and/or enlarged/reduced.

However, in spite of the adjustment of the position and/or size of the privacy mask in response to the rotation or zooming of the monitoring camera 100, the adjusted privacy mask may inaccurately mask the monitored image that is shifted and/or enlarged/reduced. In particular, when the monitoring camera 100 is zoomed in or out (change of a zoom ratio), inaccurate adjustment of the privacy mask may occur frequently.

In relation to the change of a zoom ratio of the monitoring camera 100, the inaccurate adjustment of the privacy mask may be caused by the fact that the CCD center axis does not coincide with the lens optical center axis. The CCD center axis and the lens optical center axis of the monitoring camera 100 may not coincide physically because of improper mounting of the CCD on a printed circuit board (PCB), misalignment of the lenses, or the like.

To lessen such problems resulting from the non-coincidence between the CCD center axis and the lens optical center axis, a microcomputer of the monitoring camera 100 enlarges or reduces the privacy mask and simultaneously shifts the privacy mask relative to the lens optical center axis, instead of the CCD center axis, when the zoom ratio changes.

However, if the monitoring camera rotates in the tilting direction and the tilt angle becomes greater than 90° to cause inversion of the image, while the zoom ratio also changes, then the center of rotation of the captured image may become different from the center of shift of the privacy mask. Consequently, the privacy mask may be inaccurately adjusted, and will fail to completely mask the monitored image and/or the specified target object.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

An object of the present invention is to provide an accurate control of a privacy mask display.

Another object of the invention is to provide compensation for at least one of either the tilt angle exceeding 90° or the zoom ratio changes in a monitoring camera.

Another object of the invention is to compensate for non-coincidence of the CCD center axis and lens optical center axis.

In accordance with an aspect of the present invention, the above and other objects can be accomplished by the provision of a method for controlling a privacy mask display that includes: if a monitoring camera is tilted and a current tilt angle thereof is greater than a predetermined angle, rotating a mask overlapped with and displayed in a monitoring frame 180° with respect to a CCD center axis, and compensating an optical center axis stored in the monitoring camera; and if a zoom ratio of the monitoring camera changes, adjusting the size and position of the rotated mask relative to the compensated optical center axis.

Preferably, the optical center axis is rotated 180° relative to the CCD center axis if the current tilt angle is greater than the predetermined angle. The predetermined angle may be 90°, and the optical center axis may be stored using an offset from the CCD center axis.

In accordance with another aspect of the present invention, there is provided an apparatus for controlling a mask display that includes: a signal processor for processing a CCD output signal of a monitoring camera into an image; a mask generator for generating a mask to be overlapped with and displayed in a region of the image; a memory for storing an optical center axis of the monitoring camera; and a controller for rotating the mask 180° with respect to a CCD center axis and compensating the optical center axis if the tilt angle of the monitoring camera is greater than a predetermined angle, and for controlling the mask generator to adjust a position of the mask differently according to the tilt angle if a zoom ratio of the monitoring camera changes.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
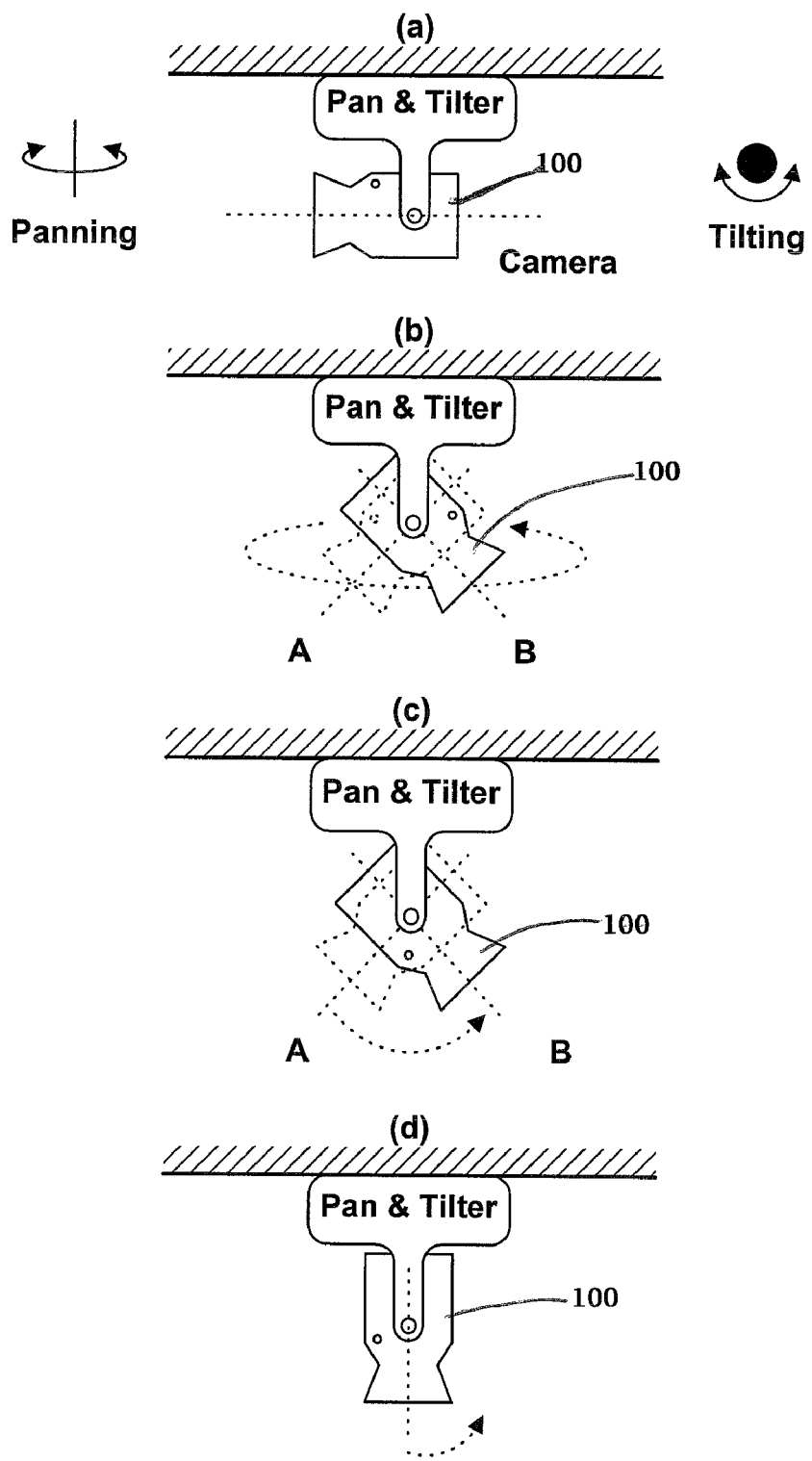
FIGS. 1a to 1d are views illustrating examples of panning and tilting of the general monitoring camera performed by the pan/tilter.
Figure 2:
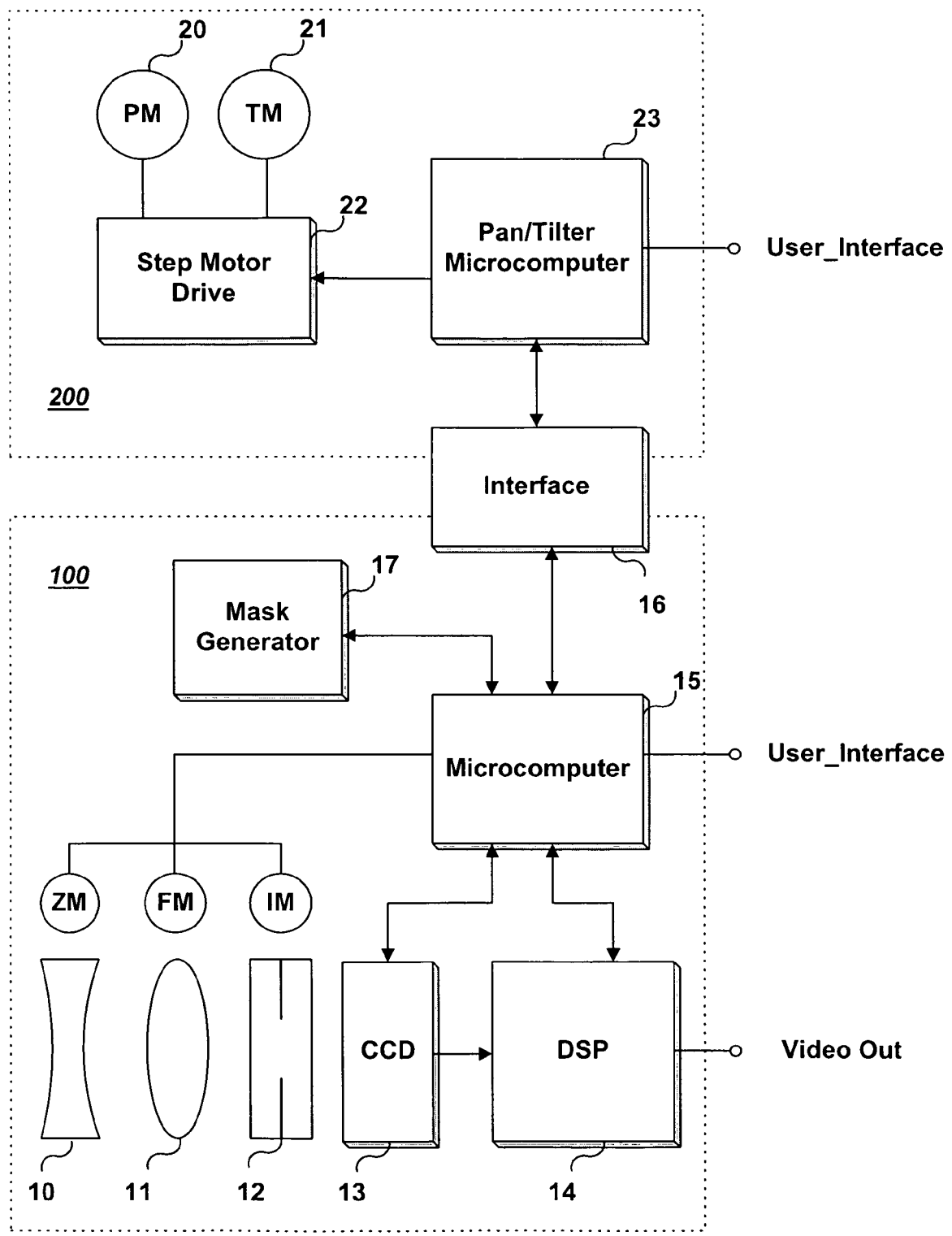
FIG. 2 is a block diagram illustrating the configuration of a monitoring camera and a pan/tilter.

FIG. 2 shows the configurations of a monitoring camera and a pan/tilter. The monitoring camera 100 includes a zoom lens 10, a focus lens 11, an iris 12, a charge coupled device (CCD) 13, a digital signal processor 14, a microcomputer 15, an interface 16, and a mask generator 17. The pan/tilter 200 includes a pan motor 20, a tilt motor 21, a step motor drive 22, and a pan/tilter microcomputer 23.

Each of the pan motor 20 and the tilt motor 21 is a step motor. To position the monitoring camera 100 such that it photographs a target object at an angle desired by the user, the pan/tilter microcomputer 23 controls the step motor drive 22 to rotate the pan motor 20 and the tilt motor 21, and detects panning (horizontal) and tilting (vertical) rotation angles, or current pan and tilt angles.

Thus, the monitoring camera 100 can monitor all around a place where the monitoring camera 100 is installed by being shifted to observe various areas of the place of installation through a pan operation (horizontal rotation) and a tilt operation (vertical rotation) of the pan/tilter 200. The pan/tilter 200 can rotate 360° in the panning direction and 180° in the tilting direction.

In such a camera, a principle underlying a change in size and position of a privacy mask for masking a target object during a zoom ratio change will be explained. A zoom lens 10 and a focus lens 11 in the monitoring camera 100 may be a combined lens. When the zoom ratio of this lens is 1, the lens's focal length, the distance from the lens to the target object, and the distance from the lens to a real image of the target object formed through the lens in the opposite direction of the target object, are assumed to be f, a, and b, respectively.

Between a, b, and f, an equation, $1/a + 1/b = 1/f$, holds, hence $b = (a \cdot f)/(a - f)$. Since the CCD 13 is placed between the lens and the real image of the target object, the size of an image of the target object formed at the CCD 13 is proportional to the distance b. Since the focal length f is much smaller than the distance a ($f \ll a$) in general, $b \approx (a \cdot f)/a = f$, meaning the distance b is proportional to the focal length f. Consequently, the size of an image formed at the CCD 13 is proportional to the lens's focal length f.

If the zoom ratio of the lens becomes n, the focal length becomes $n \cdot f$. Since the value of $n \cdot f$ is also much smaller than the distance a ($n \cdot f \ll a$), $b = (n \cdot a \cdot f)/(a - n \cdot f) \approx (n \cdot a \cdot f)/a = n \cdot f$. This means that the value of b becomes nearly n times that in the case of a zoom ratio of 1. Thus, in general, it can be assumed that if the zoom ratio becomes n, the size of the image formed at the CCD 13 becomes n times that in the case of a zoom ratio of 1. If the zoom ratio becomes n, not only does the size of the image formed at the CCD 13, namely the size of the target object in the monitored image, become n times larger, but the position of the target object in the monitored image is also shifted.

In proportion to the zoom ratio, the target object contained in the monitored image not only becomes larger in size, but also becomes farther in distance from the optical center axis of the lens. For example, a pixel composing the target object in the monitored image of zoom ratio 2 is displayed in a position whose distance from the optical center axis is two times longer than another position of a corresponding pixel composing the target object in the monitored image of zoom ratio 1. Namely, if the zoom ratio changes from 1 to n, the target object in the monitored image becomes two times farther from the optical center axis of the lens than that before the zoom ratio change.

If the zoom ratio changes from Z1 to Z2, a point P1 in the monitored image of zoom ratio Z1 shifts to a point P2 in that of zoom ratio Z2, where the point P2 satisfies the equation: $P2 = Z2(P1 - Pc)/Z1 + Pc$ (Equation 1), and Pc is the point of the optical center. If P2 is expressed in terms of a difference from P1, $P2 = (Z2 - Z1) \times (P1 - Pc)/Z1 + P1$ (Equation 2). In addition, the size of the target object represented by each point in the monitored image of zoom ratio Z1 becomes Z2/Z1 (Equation 3), a ratio between zoom ratios.

Consequently, if the zoom ratio changes from Z1 to Z2, a privacy mask placed to mask the target object in the monitored image of zoom ratio Z1 has to be changed using the equation above. For example, if the privacy mask is in the form of a rectangle, two diagonally opposite points of the rectangle, namely left upper end and right lower end points or left lower and right upper end points, may be transformed using the equation to reconfigure the privacy mask in response to the zoom ratio change. The center point and a vertex point of the rectangle may also be used to reconfigure the privacy mask, wherein the center point is transformed by the equation (i.e. Equation 1 or 2), and horizontal and vertical displacements of the vertex point from the center point are multiplied by the ratio between zoom ratios (i.e. Equation 3), respectively.

The privacy mask also has to be changed in size and position relative to the optical center axis in response to the zoom ratio change. Hence, if the CCD center axis and the optical center axis of the lens do not coincide, the position or offset of the optical center axis of the lens has to be measured in advance and managed.

That is, if the tilt angle exceeds 90°, an image in a captured image frame (or monitored image) will need to be rotated relative to the CCD center axis, namely the center of the captured image frame(or monitored image). If such a rotation occurs, then the position of the optical center axis will also need to be rotated relative to the center of the captured image frame. Thus, if the tilt angle exceeds 90°, the present invention manages a new optical center axis obtained through rotating the position of the optical center axis relative to the center of the captured image frame by 180°, and controls the position of the privacy mask according to any occurring zoom ratio change.

Hereinafter, methods for controlling a privacy mask display according to the present invention are explained. It is first noted that the position of the optical center axis is measured and stored in a memory (not shown) in advance during assembly of the monitoring camera 100.

When the monitoring camera 100 is put to use, the pan/tilter 200 performs a tilting operation by vertically rotating the monitoring camera 100, and a panning operation by horizontally rotating the monitoring camera 100 according to user requests. Meanwhile, according to user requests, the microcomputer 15 of the monitoring camera 100 also controls the mask generator 17 to overlap a privacy mask of a predetermined size with a captured image frame at a proper region so that a specified target object requiring privacy protection is not exposed to the captured image frame.

To control the privacy mask when the zoom ratio changes according to user requests, the microcomputer 15 controls the mask generator 17 to adjust the size of the privacy mask according to a newly changed zoom ratio as discussed above, reads the position of the stored optical center axis from the memory, and shifts the position of the privacy mask relative to the read optical center axis. For example, if the zoom ratio changes from Z1 to Z2, pairs of two opposing points (for example, diagonally opposing points) located in the edges of the mask may be transformed using the equation P2=Z2(P1−Pc)/Z1+Pc or P2=(Z2−Z1)×(P1−Pc)/Z1+P1 where the P1 is the position of a point in the Z1 zoom ratio, P2 is a shifted point in the Z2 zoom ratio, and Pc is the point of the optical center being used. Alternatively, only a center point of the mask maybe transformed using either of the equations 1 or 2 for P2, while the horizontal and vertical displacements of the edge points of the mask from the center point of the mask occur by multiplying the distance from the center point of the mask to the edge point by the ratio between the zoom ratio Z2/Z1. To use an analogy, the method may be thought of as stretching an elastic fabric while moving the fabric.

To control the privacy mask when the tilt angle becomes greater than 90° by a tilting operation of the pan/tilter 200, the microcomputer 15 of the monitoring camera 100 controls the digital signal processor 14 to rotate the image in the captured image frame relative to the CCD center axis by 180°, and simultaneously controls the mask generator 17 to rotate the privacy mask relative to the CCD center axis.

Figure 3:
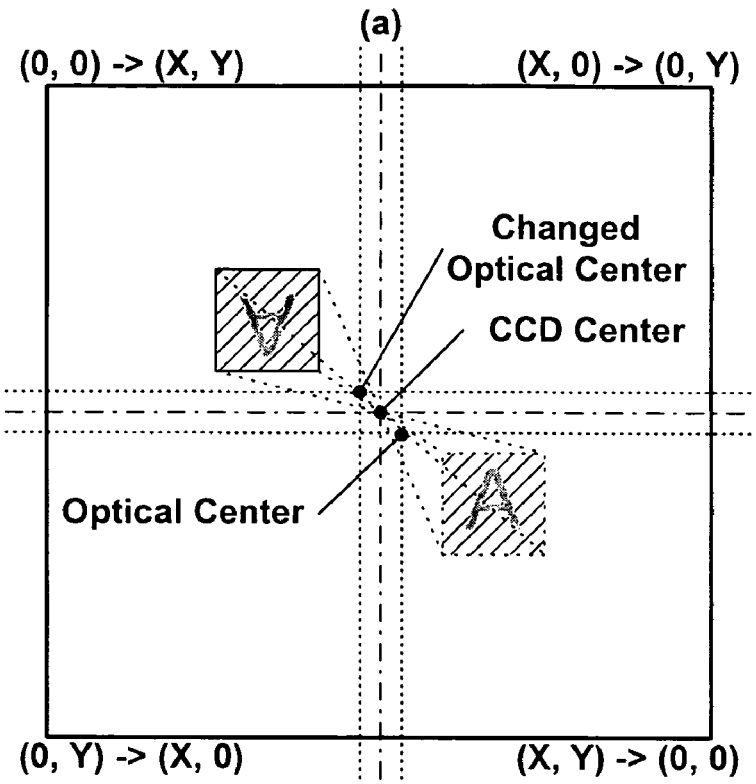
FIGS. 3a and 3b and 4a and 4b are views illustrating image transformations in a privacy mask display control method according to the present invention.
Figure 3:
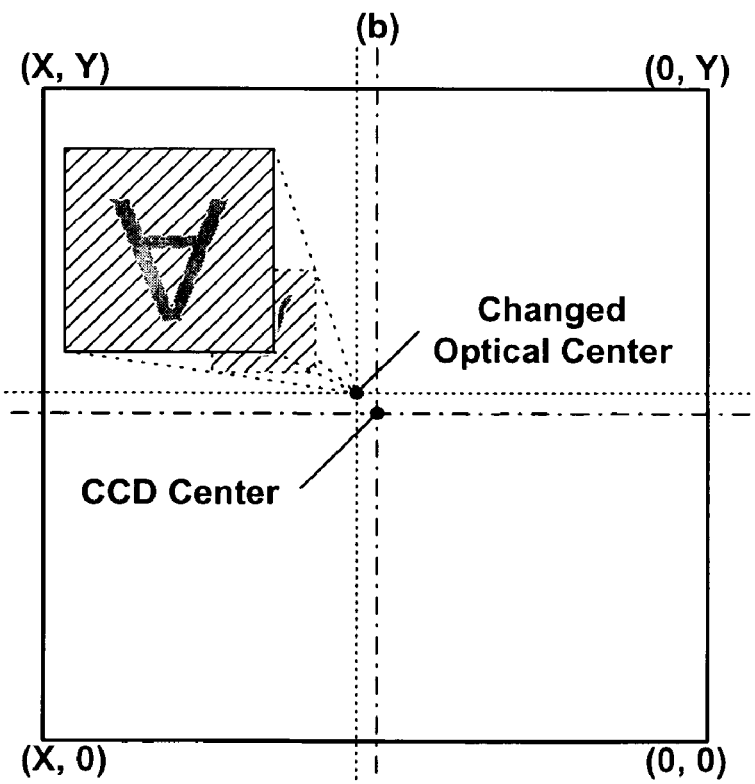

Hereinafter, methods for controlling a privacy mask display when the tilt angle is greater than 90° in addition to a zoom ratio change, or vice versa, are explained. To control the privacy mask when the zoom ratio changes after the image in the captured image frame and the privacy mask are rotated relative to the CCD center axis owing to a tilt angle of greater than 90°, the microcomputer 15 of the monitoring camera 100, as shown in FIGS. 3(a) and 3(b), performs appropriate actions as follows. The microcomputer 15 reads the stored position of the optical center axis from the memory, computes a position of the new optical center axis by rotating the read position of the stored optical center axis relative to the CCD center axis by 180°, controls the mask generator 17 to adjust the size of the privacy mask according to the newly changed zoom ratio as discussed above, and/or shifts the position of the privacy mask relative to the position of the new optical center axis as discussed above.

FIG. 3(a) shows the rotation of the optical center relative to the CCD center by 180°. The optical center is located in a lower right quadrant initially. Associated with the stored or initial center is a mask indicated with a letter "A". In FIG. 3(a), the mask is shown as a square. However, any other shape for the mask is also possible, including rectangle, oval, circle, star shape, pictures, images, and/or outlines. Once the tilt angle exceeds 90°, the optical center is rotated relative to the CCD center by 180°, and becomes positioned in the upper left quadrant. The mask is then moved correspondingly. The 180° rotation about the CCD center axis is indicated by the translation of (o,o)→(x,y); (x,o)→(o,y); (x,y)→(o,o); and (o,y)→(x,o).

FIG. 3(b) shows the adjusting of size of the mask according to the changed zoom ratio. As shown, once the optical center axis and the mask is moved as shown in FIG. 3(a), the size of the mask is changed, in this case, increased, by the ratio between zoom ratios (Equation 3) as discussed above. At the same time, the position of the mask is also shifted by using Equation 1 or 2 to shift the center point of the mask, in this case, away from the new optical center axis. That is, the size adjustment and shift of the mask is done by the alternative methods discussed above. Of course, the size of the mask may also be decreased, and the mask shifted closer to the new optical axis if the zoom decreases, using the alternative methods discussed above.

Figure 4:
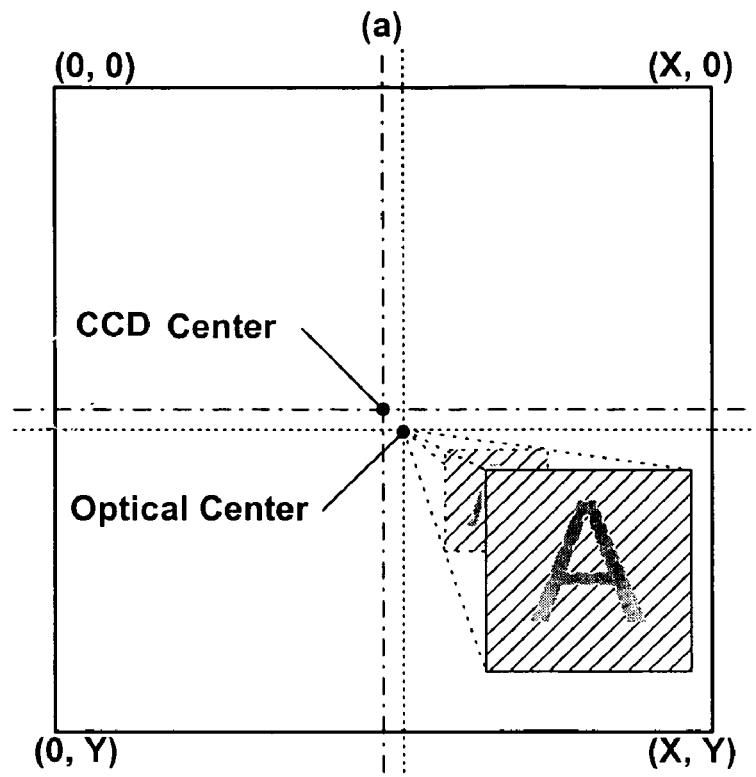
Figure 4:
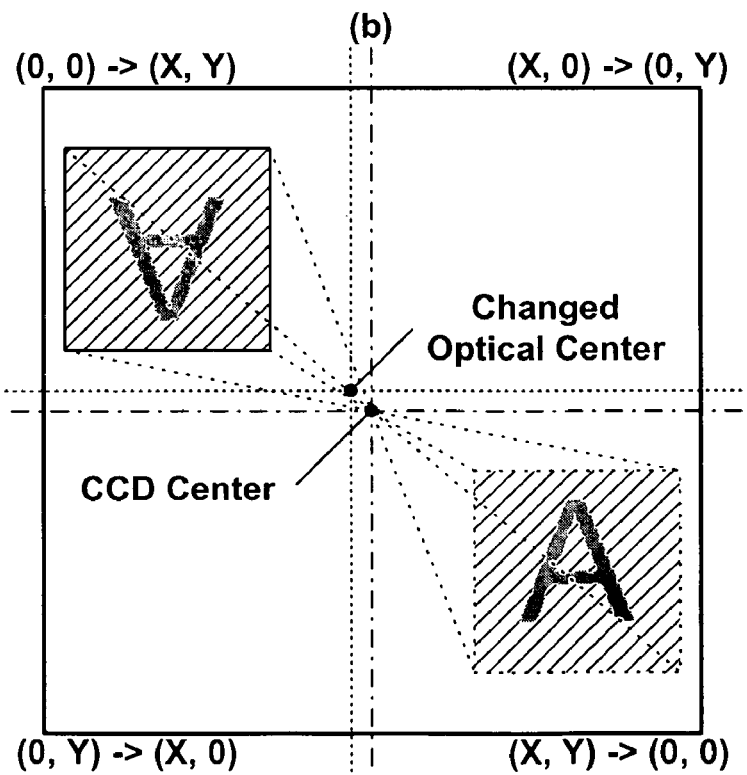

On the other hand, to control the privacy mask when the tilt angle becomes greater than 90° after the privacy mask is adjusted in size and position relative to the stored optical center axis that is read from the memory, the microcomputer 15 performs appropriate actions as follows as shown in FIG. 4(a) and FIG. 4(b). The microcomputer 15 controls the mask generator 17 to adjust the size of and shifts the privacy mask according to the newly changed zoom ratio, as discussed above, controls the digital signal processor 14 to rotate the image in the captured image frame relative to the CCD center axis, simultaneously controls the mask generator 17 to rotate the adjusted privacy mask relative to the CCD center axis, and/or computes a position of a new optical center axis by rotating the position of the stored optical center axis relative to the CCD center axis.

As shown in FIG. 4(a), the mask is positioned initially in the lower right quadrant. The size of the mask is changed, in this case, increased, by the ratio between the zoom ratios (Equation 3). At the same time, the position of the mask is shifted, in this case, away from the optical center axis. The size adjustment and shift of the mask is done by either methods discussed above.

Thereafter, if the tilt angle exceeds 90°, as shown in FIG. 4(b), the optical center axis is rotated relative to the CCD center axis by 180°, whereby the new optical axis is computed and rotated by 180° relative to the CCD center axis, and becomes positioned in the upper left quadrant. The 180° rotation about the CCD center axis is indicated by the translation of various points such as (o,o)→(x,y); (x,o)→(o,y); (x,y)→(o,o); and (o,y)→(x,o).

Afterwards, if the tilt angle becomes less than or equal to 90°, the microcomputer 15 of the monitoring camera 100 displays the image contained in the captured image frame with another rotation, and controls the mask generator 17 to re-rotate the privacy mask and the optical center axis rotated relative to the CCD center axis by 180° so that the privacy mask returns to the original position. The rotation method to re-rotate the privacy mask and the optical center axis is the same as rotating the privacy mask and the optical center axis.

Accordingly, the present invention enables the monitoring camera to freely perform zooming and tilting operations without danger of exposing the privacy-protected target object because the privacy mask is controlled to overlap with the target object, even under the condition that the optical center axis and the CCD center axis of the monitoring camera do not coincide.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for controlling a mask display, comprising:
   rotating a mask overlapped with and displayed in a monitoring frame 180° with respect to a center axis of a charge coupled device (CCD) and compensating an optical center axis that is stored of the monitoring camera when a monitoring camera is tilted and a current tilt angle of the monitoring camera is greater than a predetermined angle; and
   adjusting a size and a position of the rotated mask relative to the compensated optical center axis, when a zoom ratio of the monitoring camera changes.

2. The method as set forth in claim 1, wherein the predetermined angle is 90°.

3. The method as set forth in claim 2, wherein the optical center axis is rotated 180° relative to the CCD center axis when the current tilt angle is greater than the predetermined angle.

4. The method as set forth in claim 1, wherein the optical center axis is stored based on an offset from the CCD center axis.

5. The method as set forth in claim 1, further comprising rotating the rotated mask 180° relative to the CCD center axis and restoring the compensated optical center axis to an original value, when the monitoring camera is tilted and the current tilt angle of the monitoring camera returns to an angle less than the predetermined angle.

6. An apparatus for controlling a mask display, comprising:
   a signal processor for processing an output signal of a charge coupled device (CCD) of a monitoring camera into an image frame;
   a mask generator for generating a mask to be overlapped with and displayed in a region of the image frame;
   a memory for storing an optical center axis of the monitoring camera; and
   a controller for rotating the mask 180° with respect to a center axis of the CCD and compensating the optical center axis when the tilt angle of the monitoring camera is greater than a predetermined angle, and for controlling the mask generator to adjust a position of the mask differently according to the tilt angle and based on the compensated optical center axis, when a zoom ratio of the monitoring camera changes.

7. The apparatus as set forth in claim 6, wherein the predetermined angle is 90°.

8. The apparatus as set forth in claim 7, wherein the controller controls the signal processor to rotate the image frame 180° relative to the CCD center axis when the tilt angle of the monitoring camera is greater than the predetermined angle.

9. The apparatus as set forth in claim 7, wherein the optical center axis is rotated 180° relative to the CCD center axis when the tilt angle of the monitoring camera is greater than the predetermined angle.

10. The apparatus as set forth in claim 9, wherein the position of the mask is adjusted relative to the optical center axis stored in the memory when the zoom ratio changes when the tilt angle of the monitoring camera is less than the predetermined angle, and the position of the mask is adjusted relative to the optical center axis rotated 180° with respect to the CCD center axis when the zoom ratio changes when the tilt angle is greater than the predetermined angle.

11. The apparatus as set forth in claim 6, wherein the optical center axis is stored based on an offset from the CCD center axis.

12. The apparatus as set forth in claim 6, wherein the controller controls the mask generator to rotate the rotated mask another 180° relative to the CCD center axis, and restores the compensated optical center axis to an initially set value when the tilt angle of the monitoring camera becomes less than the predetermined angle.

13. A method for covering a desired portion of an image with a cover, wherein the image is obtained by a camera having a CCD center axis, the method comprising:
   moving the cover correspondingly with a movement of a center point of the image;
   shifting the cover correspondingly with adjustment of a size of the image; and
   adjusting a size of the cover correspondingly with the adjustment of the size of the image, wherein the cover is shifted by shifting a center point of the cover to a point $P_2 = Z_2(P_1 - P_c)/Z_1 + P_c$, wherein $P_c$ is the center point of the image, $Z_1$ is a zoom ratio of the camera before the size change of the image, $Z_2$ is the zoom ratio of the camera after the size change of the image, and $P_1$ is a position of the center point of the cover before the size change of the image.

14. The method as set forth in claim 13, wherein the moving of the cover occurs when a tilt angle of the camera is greater than a prescribed angle.

15. The method as set forth in claim 14, wherein the prescribed angle is 90°.

16. The method as set forth in claim 13, wherein the cover is moved by a rotation of 180° about the CCD center axis.

17. The method as set forth in claim 13, wherein the size of the cover is adjusted by having at least one point on at least one edge of the cover be vertically and horizontally displaced by multiplying a distance from the at least one point to the center point of the image by the ratio $Z_2/Z_1$.

18. A method for covering a desired portion of an image with a cover, wherein the image is obtained by a camera having a CCD center axis, the method comprising:

moving the cover correspondingly with a movement of a center point of the image;

shifting the cover correspondingly with adjustment of a size of the image; and adjusting a size of the cover correspondingly with the adjustment of the size of the image, wherein the cover is shifted by shifting a center point of the cover to a point $P_2=(Z_2-Z_1)\times(P_1-P_c)/Z_1+P_1$, wherein $P_c$ is the center point of the image, $Z_1$ is a zoom ratio of the camera before the size change of the image, $Z_2$ is the zoom ratio of the camera after the size change of the image, and $P_1$ is a position of the center point of the cover before the size change of the image.

* * * * *